United States Patent [19]
Hornby

[11] Patent Number: 5,081,611
[45] Date of Patent: Jan. 14, 1992

[54] METHODS FOR DETERMINING FORMATION AND BOREHOLE PARAMETERS VIA TWO-DIMENSIONAL TOMOGRAPHIC RECONSTRUCTION OF FORMATION SLOWNESS

[75] Inventor: Brian E. Hornby, Cambridge, England

[73] Assignee: Schlumberger Technology Corporation, New York, N.Y.

[21] Appl. No.: 665,104

[22] Filed: Mar. 6, 1991

[51] Int. Cl.$^5$ .............................................. G01V 1/40
[52] U.S. Cl. ...................................... 367/25; 367/27; 364/422
[58] Field of Search ................... 364/422; 367/25, 27, 367/34, 35, 57, 61

[56] References Cited

U.S. PATENT DOCUMENTS

| | | | |
|---|---|---|---|
| 4,468,623 | 8/1984 | Gianzero et al. | 324/367 |
| 4,594,691 | 6/1986 | Kimball et al. | 367/32 |
| 4,755,944 | 7/1988 | Glass | 364/422 |
| 4,809,236 | 2/1985 | Hsu et al. | 367/28 |
| 4,817,059 | 3/1989 | Hornby et al. | 367/28 |
| 4,870,627 | 9/1989 | Hsu et al. | 367/69 |

OTHER PUBLICATIONS

"Geophysical Imaging with Backprojection and Zeroth Order Phase Approx.," Geophysical Research Letters, vol. 17, #6, May 1990, pp. 673-676.

"Semblance Processing of Borehole Acoustic Array Data" by Kimball and Marzetta, Geophysics, vol. 49, No. 3, Mar. 1984, pp. 274-281.

"Estimating Slowness Dispersion From Arrays of Sonic Logging Waveforms" by Lang et al., Geophysics, vol. 52, No. 4, Apr. 1987, pp. 530-544.

Primary Examiner—Ian J. Lobo
Attorney, Agent, or Firm—David P. Gordon; Marc D. Foodman

[57] ABSTRACT

Methods are provided for determining the axial and radial slowness of a formation traversed by a borehole via utilization of sonic data obtained from a sonic borehole tool having a plurality of detectors. The methods utilize first arrival time information, ray tracing techniques, and backprojection techniques. The differences between the actually measured first arrival times and the theoretical first arrival times as calculated by ray tracing through an initial slowness model of the formation, are backprojected along the theoretical ray paths of first arrival in order to modify the initial slowness model of a formation. The methods utilized are preferably iterative, such that the modified slowness model is then utilized for additional ray tracing and backprojection. Secondary arrivals may also be utilized to refine slowness determinations made from first arrival information.

30 Claims, 9 Drawing Sheets

FIG. 1A.

PRIOR ART

FIG. 1B.

PRIOR ART

FIG. 6B. Slowness Image

FIG. 6A. Travel Time

0   12   24
Distance from borehole (in)

100   140   180
Slowness (usec/ft)

METHODS FOR DETERMINING FORMATION AND BOREHOLE PARAMETERS VIA TWO-DIMENSIONAL TOMOGRAPHIC RECONSTRUCTION OF FORMATION SLOWNESS

BACKGROUND OF THE INVENTION

1. Field of the Invention

This invention relates generally to methods for investigating subsurface formations by using sonic measurements made by a borehole logging tool. More particularly, this invention relates to methods for determining formation slowness both along a borehole and as a function of distance from a borehole.

2. State of the Prior Art

Numerous borehole tools capable of making sonic measurements are well known in the art. Many of the tools include a single source of sonic waves and two receivers. Other tools include numerous receivers which are arranged in an array. While the sonic tools of the art are useful in providing a large range of determinations regarding the formation and/or the borehole parameters, a primary usage for borehole sonic measurements is the estimation of compressional wave formation slowness (i.e. slowness being defined as the inverse of velocity). Compressional wave formation slowness is typically estimated using travel times acquired via a first motion detection process. In particular, for a basic single source, two receiver tool as suggested by prior art FIG. 1a, formation slowness is estimated by subtracting the arrival times between two receivers and dividing by the inter-receiver spacing. Of course, this estimate is subject to inaccuracies due to sonde tilt, borehole washouts, bed boundary effects, etc. In an attempt to compensate for such "environmental" effects, additional sonic sources and receivers have been used.

Figure 1A:
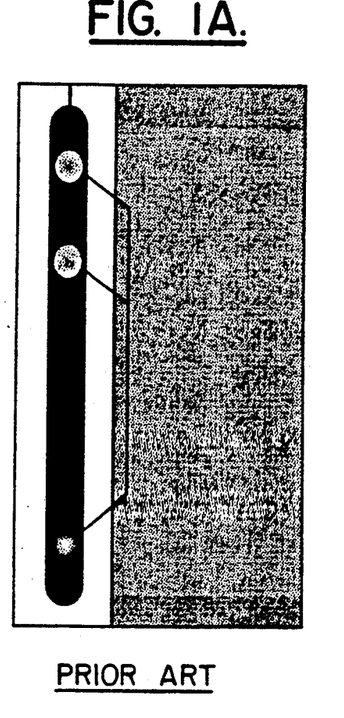
FIGS. 1a and 1b are prior art diagrams of an array sonic tool and the first arrival ray paths through a homogeneous and a damaged formation respectively.
Figure 1B:
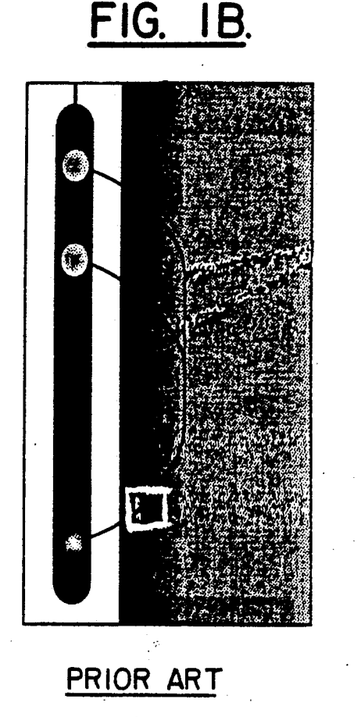

Besides showing a basic sonic tool, prior art FIG. 1a shows estimated first arrival ray paths for the case of a homogeneous formation. Prior art FIG. 1b shows estimated first arrival ray paths for the case of a damaged zone which extends some distance from the borehole into the formation. Using prior art techniques of subtracting travel times detected by receivers of known offset to arrive at a slowness value, it will be appreciated that the slowness estimates for the situations presented in FIGS. 1a and 1b will be nearly identical even though the actual arrival times will be greater for the damaged formation (FIG. 1b) as opposed to the undamaged formation (FIG. 1a). Thus, the prior art method of simply subtracting travel times to arrive at a slowness value ends up providing a one dimensional value for axial formation slowness and discards valuable information inherent in the signal regarding properties of the formation in the radial direction. The prior art does not provide methods for finding radial slowness variations.

SUMMARY OF THE INVENTION

It is therefore an object of the invention to provide methods for determining formation slowness as a function of both radial distance away from the borehole and axial distance along the borehole via use of recorded or computed borehole sonic travel times.

It is another object of the invention to apply tomographic reconstruction techniques to a series of provisional ray tracings in order to reconstruct the axial and radial slowness of the near-borehole formation.

It is a further object of the invention to provide methods for obtaining axial and radial slowness of the near-borehole formation via use of both first and secondary arrivals.

It is yet another object of the invention to provide methods for obtaining a two dimensional map of borehole slowness and borehole size, computed both as a function of radial distance away from the borehole center and axial distance along the borehole using recorded or computed first motion detected sonic travel times.

In accord with the objects of the invention, a method for determining the axial and radial slowness of a formation broadly comprises utilizing first arrival time information, ray tracing techniques, and backprojection techniques to modify an initial slowness model of a formation according to a nonlinear inversion. The modified slowness model provides radial and axial determinations of formation slowness along a borehole.

More particularly, in accord with a preferred aspect of the invention, first arrival times are determined for a plurality of sonic receivers. Initial slowness values for formation segments or cells along and extending radially from the borehole are provided, such as by computing the difference in arrival times of two or more receivers located at the longest source to receiver offset of the sonic tool, or by assuming an initial slowness. Then, using the initial slowness values, all possible ray paths are traced from the source, through the formation segments, to each receiver in accord with Snell's law. From the possible ray paths and the initial slowness values for the formation segments theoretical arrival times corresponding to the ray paths are computed. The ray path corresponding to the shortest or first arrival time is chosen. A function of the actual arrival time and the chosen theoretical arrival time (e.g. the ratio or difference of the two) for each receiver is then backprojected along the chosen ray path, thereby modifying the initial slowness values of the formation segments. With the modified slowness values, the procedure of tracing all possible ray paths, calculating theoretical arrival times, and backprojecting a function of the theoretical and actual arrival times is iterated. Iteration continues until a predetermined number of iterations is accomplished, or until a threshold regarding the modification resulting from the iterations or the difference between the measured and computed arrival times is met. Once the iteration process is completed, the determined slowness as a function of borehole depth and radial distance from the borehole may be taken as a final determination. The final determination is advantageously displayed as a borehole log showing depth (or distance) in the borehole along the y axis, radial distance from the borehole on the x axis, and different colors, gray scales, or other indications to show relative or absolute slowness.

According to an important aspect of the invention, prior to performing the modification of the slowness of the formation segments, ray paths are traced for all source and receiver positions and proposed modified values of slowness for each formation segment are computed via the backprojection process. These proposed values of slowness are stored in a separate matrix until ray paths are traced for all possible source and receiver positions. The slowness for the formation segments are then modified by using some function of the stored proposed values for each cell. This function may be a simple average of all previously computed proposed values, or it may be a more sophisticated function such as a weighted function or a median value which would tend to reduce interference from noise in the measurements.

The method for determining the axial and radial slowness of a formation which utilizes ray tracing techniques and backprojection techniques to modify an initial slowness model of a formation according to a nonlinear inversion need not be limited to use of first arrival time information. If desired, second arrival times such as secondary refracted P-wave arrivals can be utilized. The second arrival times are computed. After formation slowness is determined using first arrival times, the first arrival times are eliminated from the analysis. The arrival time ray path corresponding to the first occurrence of the second arrival packet is chosen and an arrival time for that ray path is calculated. A function of the calculated and measured second arrival times is then backprojected over the formation segments, and the procedure is iterated if desired. The use of second arrival times is particularly advantageous in the horizontal well environment at bed transitions where arrivals from the "distant" formation arrive after the first motion arrivals.

The method invention for determining axial and radial slowness has numerous applications in the well logging arts. Among other things, the invention can be used to provide: altered or damaged zone imaging to quantify swelling clay effects; cased hole applications for determining cement thickness, imaging of caves behind casing, and changes in formation properties caused by cementing; wellbore stability determinations, including information regarding formation damage caused by stress relief due to drilling process; bed boundary location and determination of formation slowness away from the borehole in horizontal well logging; inter-well seismic and single well refection surveys (see U.S. Pat. No. 4,817,059) invaded zone investigation for finding changes in saturating fluid properties away from the borehole; and compensation for measurements obtained by devices which provide formation property determinations in a shallow zone (i.e. the damaged zone) away from the borehole.

Additional objects and advantages of the invention will become apparent to those skilled in the art upon reference to the detailed description taken in conjunction with the provided drawings.

BRIEF DESCRIPTION OF THE DRAWINGS

FIG. 4a-1 is a slowness plot of a model formation having a damaged zone.

FIG. 4a-2 is a diagram of the first arrival ray paths to twenty-four receivers for one source position;

FIG. 4b-1 is a slowness plot of the initial values chosen for the slowness of the model of FIG. 4a-1.

FIG. 4b-2 is a diagram of the ray paths traced utilizing the twenty-four receivers of FIG. 4a-2 and the slowness plot of FIG. 4b-1.

FIG. 4c-1 is a slowness plot obtained after fifty iterations according to the method of FIG. 3 starting from the slowness plot of FIG. 4b-1.

FIG. 4c-2 is a ray tracing which accompanies the slowness plot of FIG. 4c-1 after fifty iterations.

FIG. 6b is a slowness plot obtained in accord with the method invention from the waveforms of FIG. 6a.

FIG. 7b is a slowness plot obtained in accord with the method invention from the waveforms of FIG. 7a.

FIG. 9b is a slowness plot obtained in accord with the method invention from the Waveforms of FIG. 9a.

DETAILED DESCRIPTION OF THE PREFERRED EMBODIMENTS

In accord with the method invention, a sonic borehole tool having a sonic source and at least one receiver such as shown in prior art FIGS. 1a and 1b is utilized. Preferably, the sonic tool will have a plurality of receivers, and could have numerous (e.g. eight or more) receivers such as is described in Morris, C. F. et al., "A New Sonic Array Tool for Full Waveform Logging", Presented at the 54th Ann. International Mtg., Society of Petroleum Engineers, Houston, Tex. (paper 1328s). The receivers or detectors may be of different types such as those which utilize piezoelectric and magnostrictive principles. Regardless of the exact implementation of the receivers, they must be able to detect the arrival of sonic waves. Information from the sonic borehole tool, typically including waveforms generated by the receivers over time, is sent in a well known fashion to the surface of the formation via the cable from which the sonic tool is suspended in the borehole or well. The information is received by a processor, which may be a multipurpose or dedicated processor, for processing.

Figure 2A:
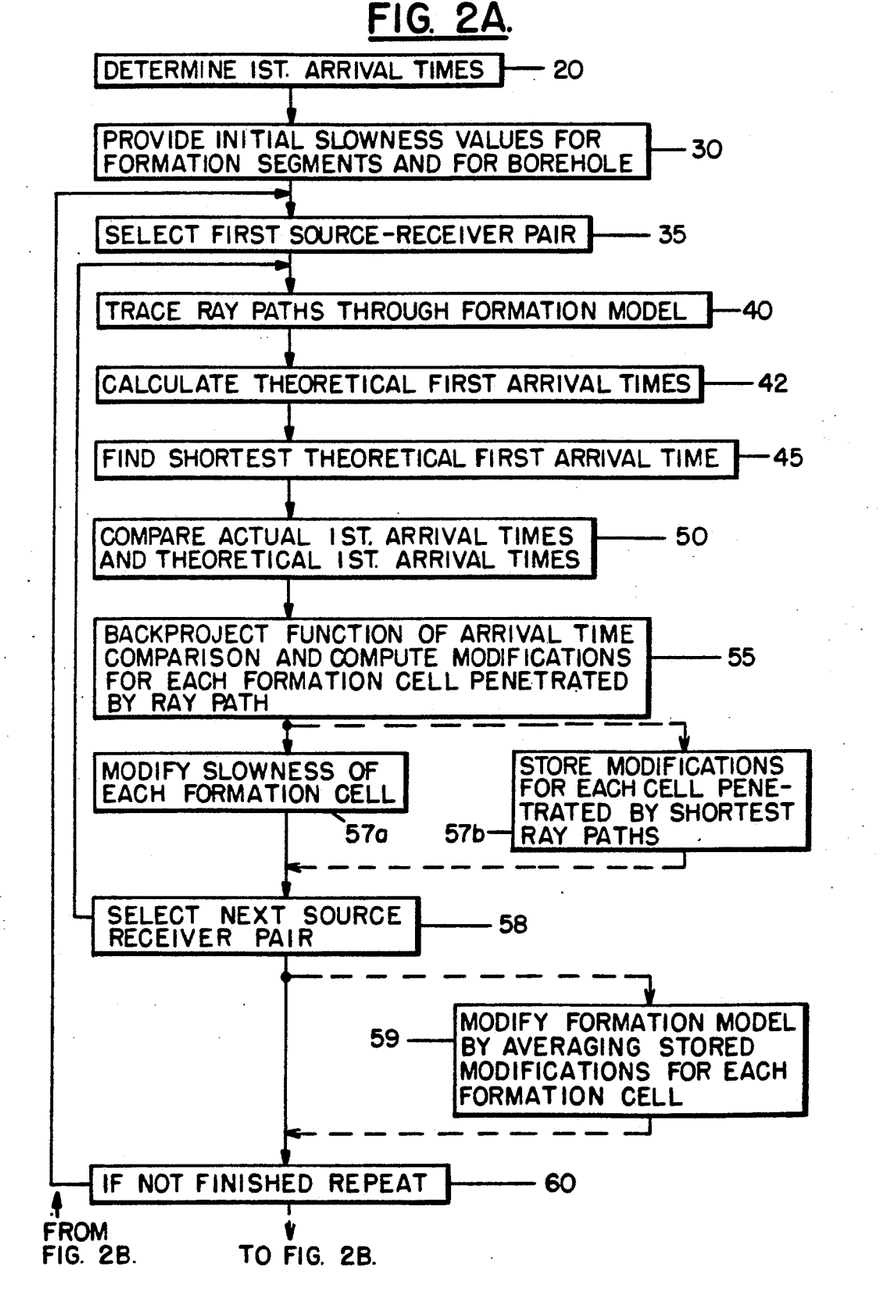
FIG. 2 is a flow chart of the method for determining axial and radial slowness of the invention.
Figure 2B:
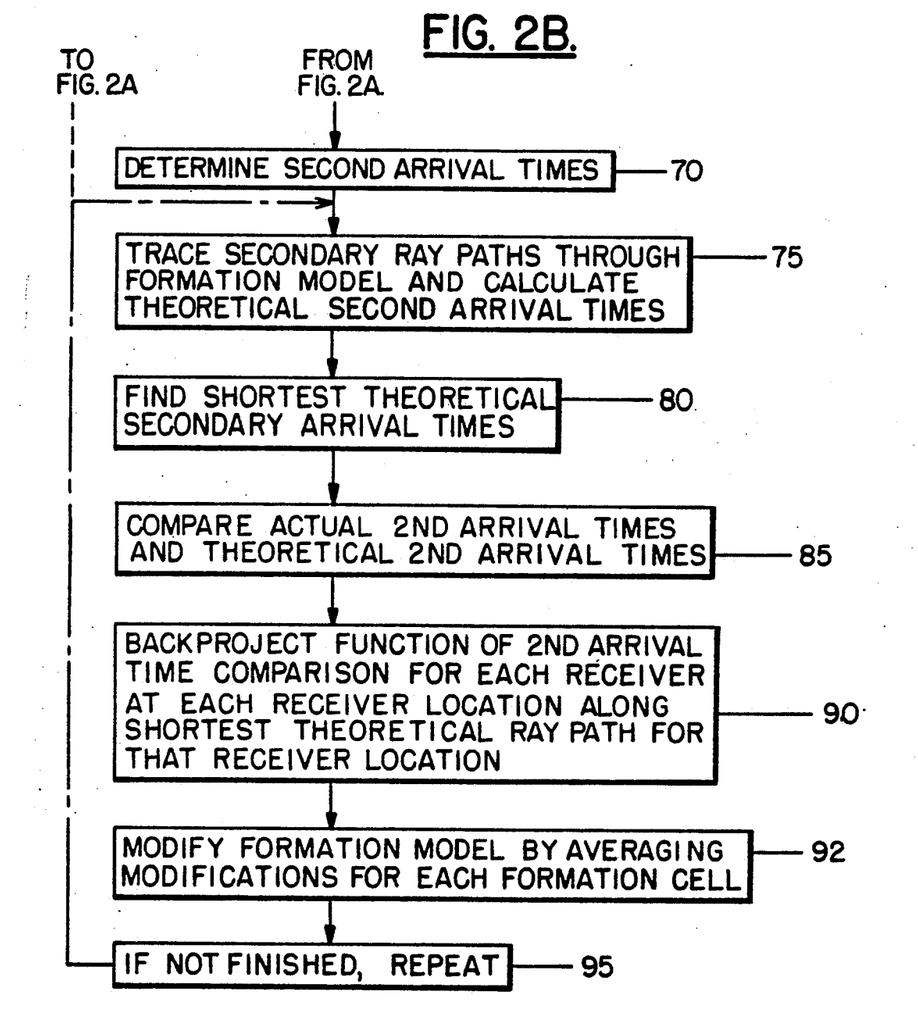

The processing required to determine axial and radial slowness of the formation from the incoming information is dictated by the method invention. As seen in FIG. 2, at step 20, first arrival times are determined for a plurality of sonic receivers. Preferably, this information is collected over desired lengths of the borehole, although, if desired, the procedure can be accomplished separately at each borehole depth. At step 30, initial slowness values for formation segments or cells extending axially and radially from the borehole are provided. The initial slowness values may be obtained by using information gained at step 20 and computing therefrom the difference in arrival times of two or more receivers located at the longest source to receiver offset of the sonic tool; preferably, at different tool locations. Alternatively, the initial slowness values for the formation may be obtained from previous knowledge or by simply assigning typical values. Initial slowness values for the borehole are also preferably entered at step 30 and are typically known as the contents of the borehole mud are typically known. If desired, information regarding the borehole radius may be entered so that the interface between the formation and borehole is better defined and so that a more realistic initial slowness value for each cell may be entered.

Using the initial slowness values for the borehole and formation, at step 35, a first source-receiver pair is selected. At step 40, all possible ray paths are traced from the source, through the formation (and borehole) segments, to the selected receiver in accord with Snell's law. From the possible ray paths determined at step 40, and the initial slowness values for the cells provided at step 30, theoretical arrival times corresponding to the ray paths are computed at step 42. The shortest theoretical arrival time for that receiver is then found at step 45, with the ray path corresponding to this theoretical shortest or first arrival time noted. At step 50, the theoretical shortest arrival time for the selected receiver is compared with the actual arrival times determined at step 20 (e.g. by taking the ratio or difference of the two) and a function of the two is then backprojected at step 55 along the noted theoretical ray path to provide modifications for the initial slowness values of the cells through which the theoretical ray path passes. According to one embodiment of the invention, the modifications calculated as a result of the backprojection step 55 are then used at step 57a to modify the formation initial slowness values. At step 58, a next source-receiver pair is chosen and steps 40–57a are repeated, with formation slowness modifications being made during each backprojection step.

According to a second embodiment of the invention, the modifications calculated as a result of the backprojection step 55 are stored at step 57b for each affected cell of the formation. As steps 40 through 57b are repeated (due to selection of next source-receiver pair at step 58), the initial slowness values for the formation are maintained, and the numerous modifications resulting from the backprojections are stored. Then, after all source-receiver pairs have been selected and modifications have been calculated at step 55 and stored at step 57b, the formation model is modified at step 59. Modification of each cell is preferably accomplished at 59 by averaging the modifications stored at step 58 for that particular cell and applying the average modification to the initial slowness model values. Of course, the median or a weighted function of the modifications may be used instead of a simple average.

Where a sonic borehole tool is being moved through a borehole, numerous sets of data may be obtained along a formation of interest. A set of data may be defined as the data obtained from all of the receivers based on the source being at a particular location. A ne set of data is obtained with the source being located at a new location. Thus, in processing the data according to the method set out in FIG. 2, data obtained by a single receiver at two different source locations can be treated as data from two different source-receiver pairs. Where slowness modifications are made during every backprojection step as at step 57a, preferably, the data from source-receiver pairs are processed by data set; i.e. modifications are made to cells based on different source-receiver pairs are made for a first source location, before data from different source locations are used.

Returning to FIG. 2, and as indicated at step 60, steps 35 through 59 are preferably repeated several times; i.e., until a predetermined number of iterations are accomplished, or until a threshold regarding the modification resulting from the iterations or the difference between the measured and computed arrival times is met. Once the iteration process is completed, the determined slowness as a function of borehole depth and radial distance from the borehole may be taken as a final determination. The final determination is advantageously displayed at step 60 as a borehole log showing depth (or distance) in the borehole along the y axis, radial distance from the borehole on the x axis, and different colors, gray scales, or other indications to show relative or absolute slowness.

The remaining steps of FIG. 2 are discussed hereinafter with reference to a further embodiment of the invention and in conjunction with FIGS. 8a–8d.

In practicing the method of the invention, a mathematical understanding is helpful. Assuming radial symmetry of the formation, including the damaged zone, formation properties can be said to be roughly the same as a function of azimuth in the borehole region within a few feet from the borehole. If the radial (r) and vertical (z) coordinates within the rock volume are indicated by $X = (X_r, X_z)$, then the unknown slowness of the rock can be defined as $u(X)$. With a borehole tool having N receivers, with a data set having L source positions (all receivers typically recording at each source position), and with travel times recorded at the receivers denoted by $t_k$, $k = 1, \ldots, K$, using a high frequency approximation, each $t_k$ may be defined as $$t_k = g_k(u) = \int_{T_k(u)} u(X)ds \qquad (1)$$

where $g_k$ is a nonlinear function, ds is arc length, and $T_k(u)$ denotes the curve connecting the source and the particular receiver which yields the least possible sonic travel time. The nonlinearity of expression (1) is due to the complex dependence of the ray path, $T_k(u)$ upon the slowness function $u(X)$.

In order to solve for the slowness function $u(X)$ given the travel times $t_k$ measured at the receivers (step 20), equation (1) must be inverted. In accord with the invention, inversion involves a sequence of ray tracing and linear inversions. Linearization is obtained by providing initial slowness values (i.e. a slowness model) for the system (step 30). As previously mentioned, for sonic logging, the slowness value(s) for the virgin formation may be estimated from the difference in travel times from a source to two different receivers (typically the largest source receiver offset pair). Alternatively, the slowness value(s) for the formation can be based on known information or simply assumed. The slowness value for the borehole may be estimated, assumed, or determined. If caliper or other information relating to borehole radius is available, that information may also be used in the slowness model of the system.

Using a slowness model u, the relationship between the formation and the travel times $t_k$ is defined according to $$t_k \approx \int_{T_k(u)} u(X)ds \quad (2)$$

Figure 3:
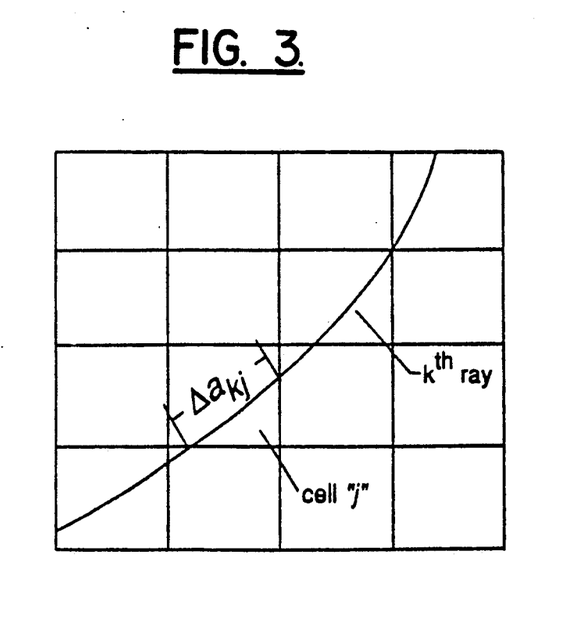
FIG. 3 is an imaging grid drawn and enlarged from the two-dimensional formation shown in FIG. 1b.

In order to construct linear equations that can be solved on a digital computer, a discrete approximation is created for the slowness function u(X). A grid is created that represents distances radially away from the borehole and vertically along the borehole axis. Such an imaging grid which represents an indicated portion of the formation of FIG. 1b is shown in FIG. 3. As indicated in FIG. 3, a ray path 115 is shown traversing formation segments 120. The distance in each segment or cell that is traversed by the ray path 115 is designated as $\Delta a_{kj}$, with j indicating the j'th cell or formation segment, and k indicating the k'th ray.

The slowness model u is used to fill the grid cells of a grid such as shown in FIG. 3 with an initial estimate for the slowness of the particular cell (step 30). Using the slowness model, a theoretical travel time $t_k$ of a sonic wave through the formation (found at step 40) is represented by $$t_k^n = \sum_{j=1}^{J} \Delta a_{kj} u_j^n \quad (3)$$

$$k = 1, 2, \ldots K$$

where J is the total number of cells intersected by the ray k, n is an iteration number, and $u_j^0 = u_j$ is an initial estimate (i.e. n=0) for the (average) slowness of cell j. For each iteration n, the residual error $\Delta t_k^n$ is the difference (i.e. the function of step 50) between the observed (i.e. measured by the borehole tool) and computed (i.e. theoretical) travel times and is determined according to $$\Delta t_k^n = t_k - t_k^n = \sum_{j=1}^{J} \Delta a_{kj} \Delta u_j^n \quad (4)$$

where $\Delta u_j^n$ is a correction to the cell slowness $u_j$ such that the residual error $\Delta t_k^n$ is reduced or equal to zero for subsequent iterations. This correction is then applied to each cell through which the j'th ray passes such that $$u_j^{n+1} = u_j^n + \Delta u_j^n \quad (5)$$

The initial ray path is the ray path defined by the unperturbed slowness function $u_j^0$. However, because the problem is nonlinear, a solution for both the slowness function and the ray path of each arrival is required. Subsequent iterations (step 60) define different ray paths as the slowness function is perturbed, until the slowness function and ray paths approach the true slowness function and ray path from the source to each receiver.

The backprojected correction set forth in equation (5) above may be determined in different manners. A first manner of determining the correction factor $\Delta u_j^n$ is to use an algebraic reconstruction technique (ART) such as set forth in Herman, G. T., et al., "ART: Mathematics and Applications: A Report on the Mathematical Foundations and on Applicability to Real Data of the Algebraic Reconstruction Techniques"; *Journal of Theoretical Biology*, 33, (1971) pp. 1-32. A standard ART algorithm is $$u_j^{n+1} = u_j^n + (\Delta a_{kj} \Delta t_k^n)/(\Sigma_j \Delta a_{kj}^2) \quad (6)$$

which requires that the slowness matrix be perturbed after each ray path is traced (step 57a).

Another manner of determining the correction factor $\Delta u_j^n$ is according to a simultaneous iterative reconstruction technique (SIRT) such as set forth in Dynes, K. A., and Lytle, R. J., "Computerized Geophysical Tomography"; *Proc. Inst. Elect. and Electron. Eng.* 67, (1979) pp. 1065-1073. With the SIRT technique, the slowness matrix is perturbed only after all K ray paths are traced. An averaged correction factor is then applied to the slowness matrix:

$$u_j^{n+1} = u_j^n + (1/M_j) \sum_{k=1}^{K} (\Delta a_{kj} \Delta t_k^n)/(\Sigma_j \Delta a_{kj}^2) \quad (7)$$

where $M_j$ is the number of ray paths actually passing through the j'th cell. An iteration n is defined to have occurred only after all K rays have been processed. An averaged correction factor (step 57b) is then computed and used to perturb (i.e. modify at step 59) the slowness matrix. For sonic logging, this form of SIRT corresponds to modifying the matrix after corrections are computed for all possible source-receiver combinations in a given data set; i.e. data gathered by the receivers for the source at various locations.

Figure 4A:
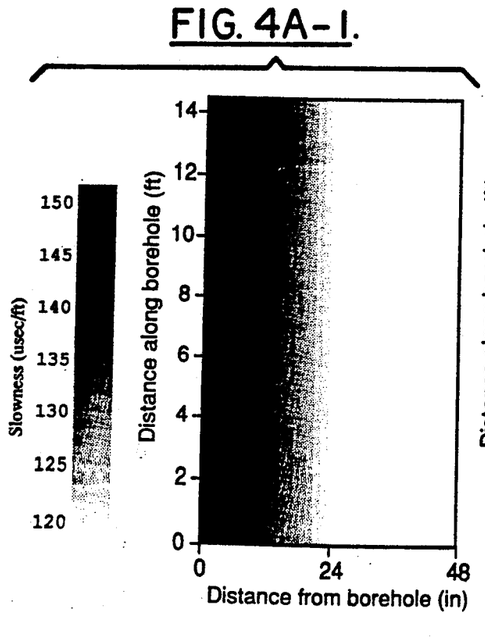
Figure 4A:
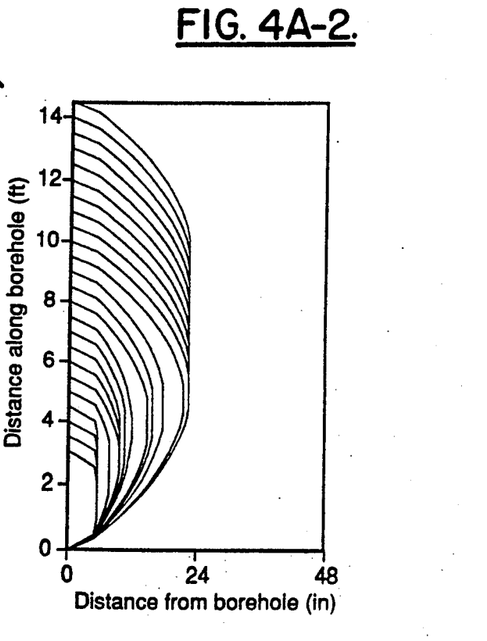

Using the method and mathematics set out above, a computer simulation was carried out. A hypothetical formation having a borehole, a damaged zone in the formation, and a virgin formation, with slowness ranging from 144 μsec/ft at the borehole wall to 120 μsec/ft at a distance 1.5 feet from the borehole wall was provided. FIG. 4a-1 is a slowness plot of that hypothetical formation. Investigation of the hypothetical formation was conducted with a simulated tool having twenty-four receivers located six inches apart at distances from three to fourteen and a half feet from a sonic source. With such a tool, simulated first arrival ray paths for the formation of FIG. 4a-1 are shown in FIG. 4a-2. From the ray paths of FIG. 4a-2, "actual" first arrival times are determined such as would have been determined at step 20 from the information provided by the receivers.

Turning to FIG. 4b-1, a slowness plot is provided of the initial values chosen in accord with step 30 of FIG. 2 for the slowness of the FIG. 4a-1 formation. As seen in FIG. 4b-1, only two different slowness values are provided; one for the borehole, and one for the formation. With the initial slowness values provided in FIG. 4b-1, rays are traced in accord with step 40 of FIG. 2 from the receivers to the source through the formation and borehole. FIG. 4b-2 is a diagram of the ray traces utilizing the twenty-four receivers of FIG. 4a-2 and the slowness plot of FIG. 4b-1. Because of the simplicity of the hypothetical formation and the fact that the ray tracking of FIG. 4a-2 is for the estimated hypothetical formation before any iterations, only one ray path is possible for each receiver. Without different possible paths, step 45 of FIG. 2 is obviated, as the shortest time ray path is the only path possible.

Figure 4B:
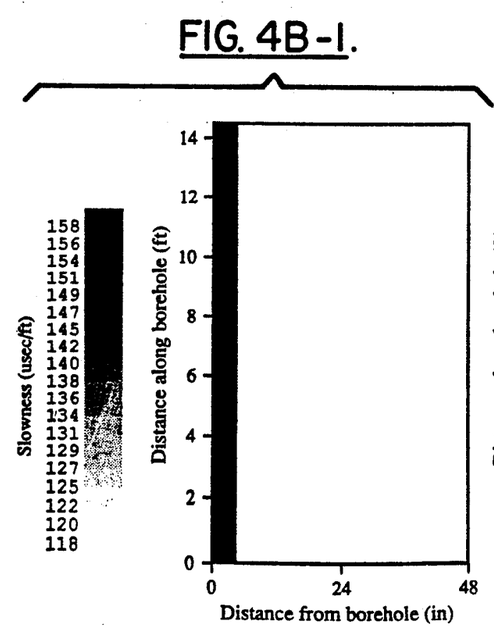
Figure 4B:
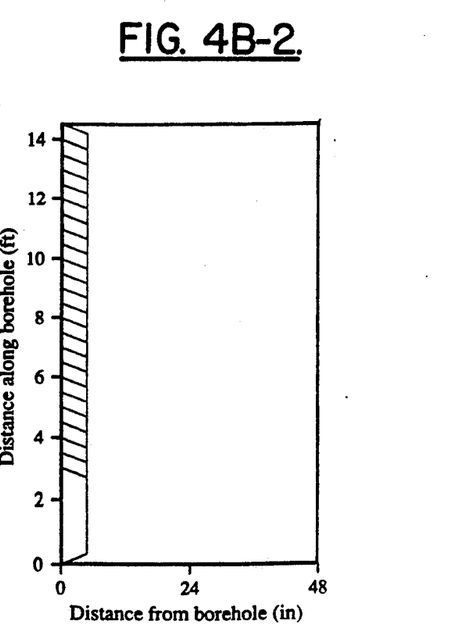
Figure 4C:
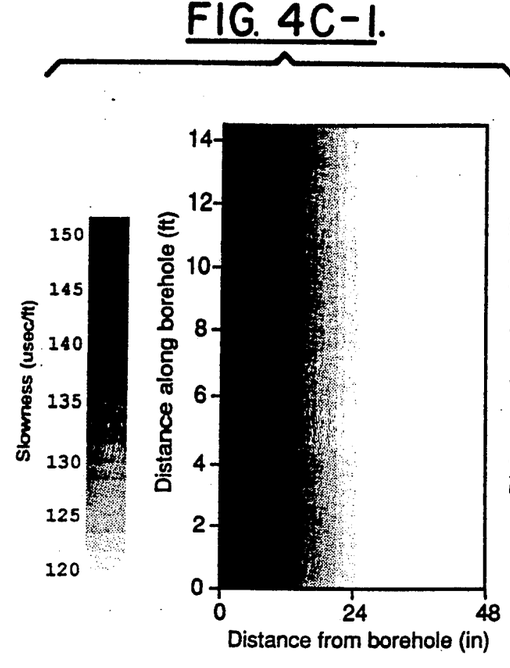
Figure 4C:
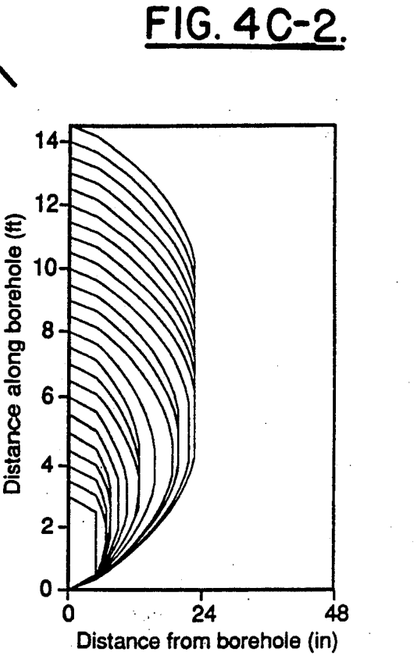

Based on the ray paths of FIG. 4b-2, and the initial slowness plot of FIG. 4b-1, the theoretical travel times were calculated according to equation (3) above. Then, in accord with step 50 and equation (4), the theoretical and hypothetical "real" travel times were compared (subtracted) to provide an error, and that error was backprojected according to step 55 and equation (6) to modify the initial slowness plot.

The simulation continued in accordance with the invention by repeating the steps of ray tracing in the modified modeled formation, calculating theoretical travel times, subtracting the theoretical and hypothetical "real" travel times, and backprojecting the error to further modify the slowness plot. One hundred twenty iterations were performed. The results of the reconstruction of the slowness of the hypothetical formation after fifty iterations is seen in the slowness plot of FIG. 4c-1. FIG. 4c-2 is the ray tracing which accompanied the slowness plot of FIG. 4c-1 after fifty iterations. By comparing FIG. 4c-1 with FIG. 4a-1, and FIG. 4c-2 with FIG. 4a-2, it is readily apparent that an excellent reconstruction was obtained for the hypothetical formation.

Figure 5:
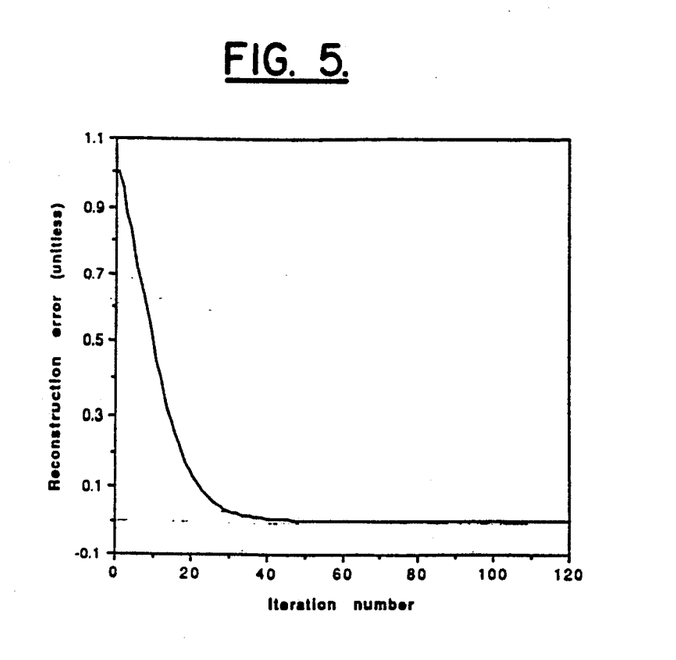
FIG. 5 is a graph comparing the reconstruction error versus the number of iterations in accord with the invention.

In order to gauge the number of iterations which might be useful in practicing the invention, the reconstruction error $t^n$ averaged over all source-receiver offsets and as a function of iteration number was plotted in FIG. 5. With the first reconstruction error (i.e. $n=1$) set to a value of one, the other reconstruction errors were scaled. FIG. 5 indicates that about eighty-six percent of the correction was accomplished in the first twenty iterations, with an additional ten percent accomplished in the next ten iterations. By forty iterations, approximately ninety-nine percent of the correction was accomplished.

Figure 6A:
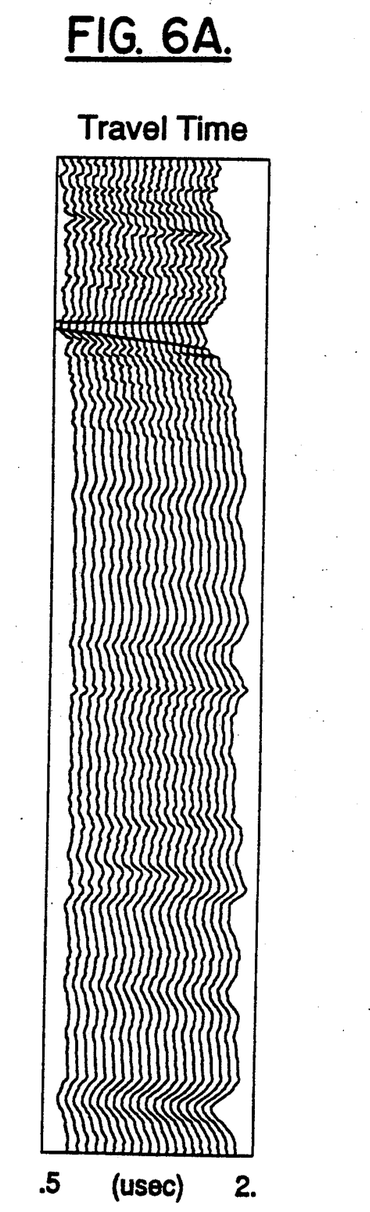
FIG. 6a shows the first arrival times detected by a sonic array tool having twenty receivers in an altered shale formation.

Turning to FIG. 6a, measured first arrival times detected by a twenty receiver sonic array tool at depths 5775 to 6300 feet in an actual altered shale formation are shown. Each vertical trace in FIG. 6a is indicative of the time of the first arrival received by a single detector utilizing digital first motion detection for numerous sets of experiments (i.e. sonic pulses) as the detector moved along the shown length of the borehole. It is immediately evident from FIG. 6a that the sonic travel times measured by the detectors along the 5775-5900 foot segment of the borehole are shorter than the travel times measured along the 5900-6250 segment. This change is typical of either a change in the lithological content or a damaged (altered) formation.

Figure 6B:
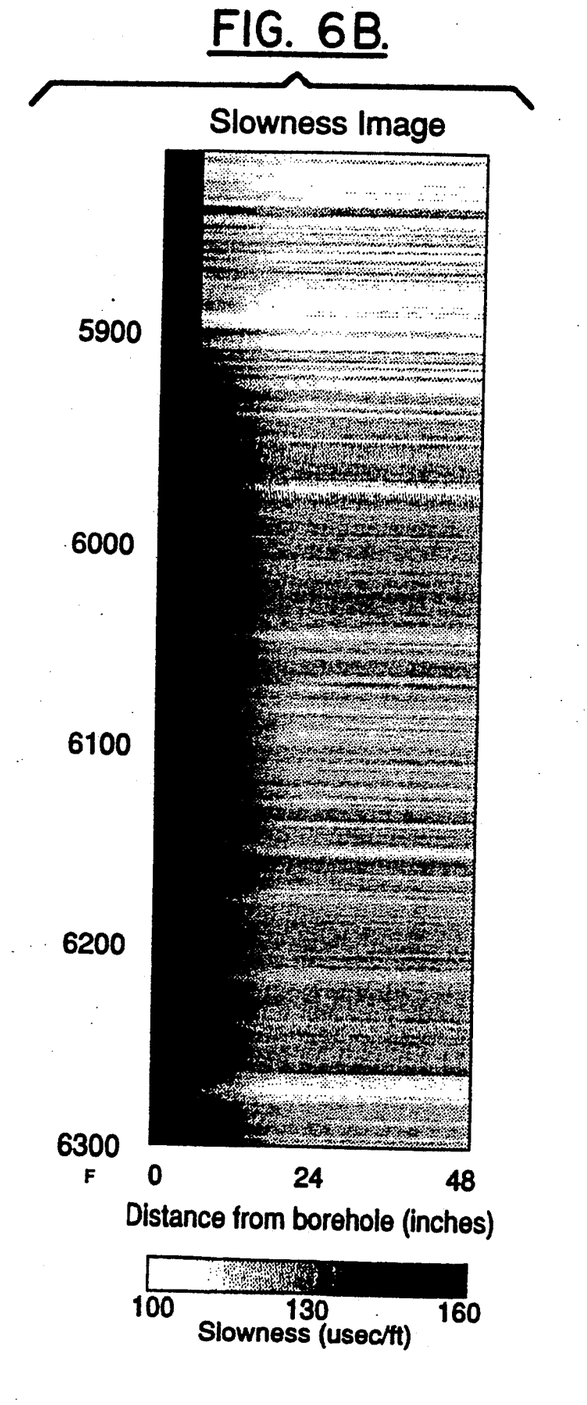

Based on the first arrival times of FIG. 6a, and based on the method invention as described with reference to FIG. 2, a reconstruction of the slowness of the formation was conducted and is shown in FIG. 6b. As indicated in FIG. 6b, starting substantially at depth 6025, and continuing downward therefrom, there are radial (x axis) changes in slowness which would be typical of borehole fluid invasion. In fact, core samples at various depths along the borehole indicated that the swelling clay smectite constituted a high percentage of the mineralogy at several points along that borehole segment. The presence of smectite confirms that the radial change in slowness is caused by borehole fluid invasion into th swelling clay.

Figure 7A:
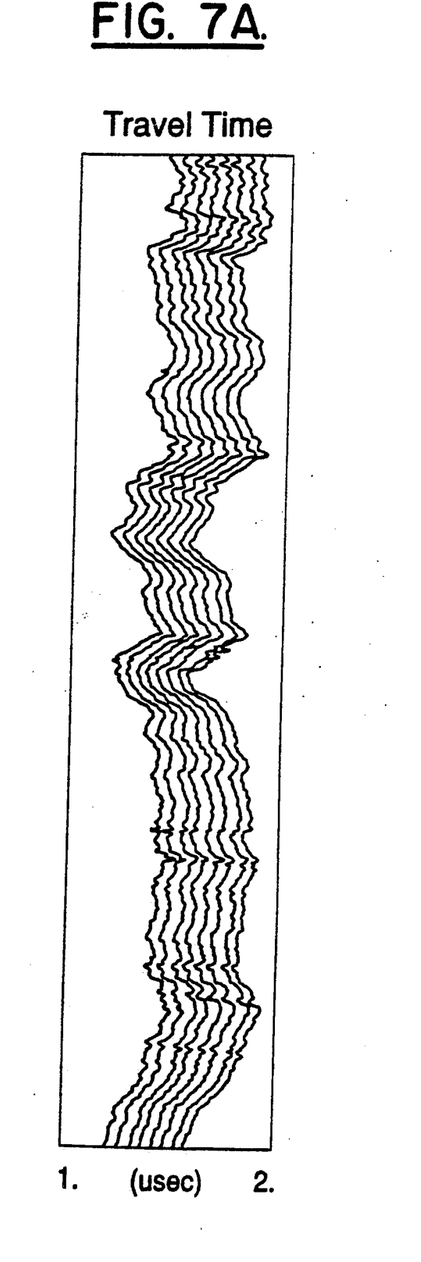
FIG. 7a shows the first arrival times detected by a sonic array tool having eight receivers in a heavy oil bearing reservoir.
Figure 7B:
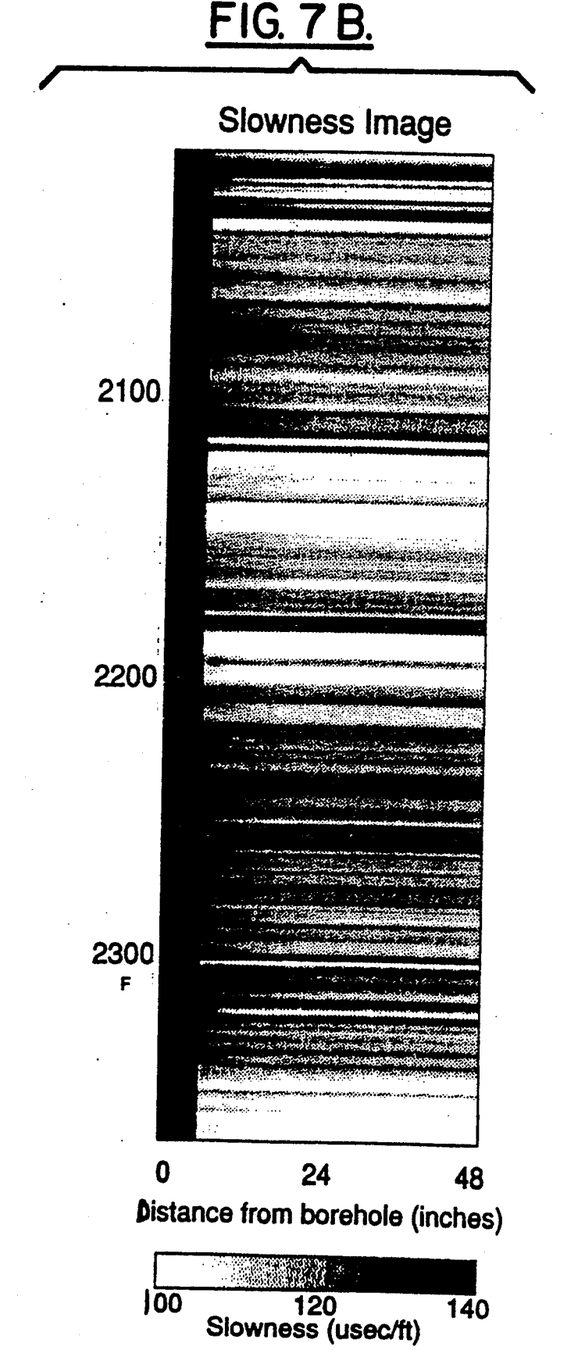

A second application of the method invention to actual data is seen with reference to FIGS. 7a and 7b. FIG. 7a shows as-processed first arrival times detected by an eight receiver sonic tool at depths 2010-2360 in a heavy oil sample. As indicated in FIG. 7a, the travel times vary substantially as compared to varying of travel times shown in altered shale sample of FIG. 6a. Again, these changes over depth can be indicative of changes in lithological content or a damaged formation near the borehole.

Based on the first arrival times of FIG. 7a, and based on the method invention as described with reference to FIG. 2, a reconstruction of the slowness of the formation was conducted. The resulting slowness plot of FIG. 7b shows axial changes in slowness, and in some cases, radial changes in slowness. The axial changes in slowness which appear as horizontal lines of constant slowness are indicative of changes in lithological content at particular locations over the borehole segment. The radial changes in slowness which appear as patches of changing slowness radial from the borehole are indicative of possible stress relief in unconsolidated sandstones. These interpretations were corroborated via a lithological evaluation of the formation.

Turning to another aspect of the invention, sonic arrivals occurring beyond the headwave, such as secondary refracted P-wave arrivals, are utilized and are particularly useful in helping reconstruct near borehole slowness in horizontal well environments. According to the preferred method of utilizing secondary arrivals, after the formation slowness is determined using first arrival times as set forth and described with reference to FIG. 2, at step 70 the second arrival times are computed. Then, utilizing the slowness plot obtained via the reconstruction of the formation slowness utilizing the first arrival times, all possible ray paths (other than first arrival time ray paths) are traced at step 75. For each receiver, the shortest theoretical secondary arrival time is found at step 80, with the ray path corresponding to this theoretical shortest secondary arrival time noted. At step 85, the theoretical shortest secondary arrival time for each receiver is compared with the actual secondary arrival times determined at step 70 by taking the difference of the two, and at step 90, that difference is backprojected through the slowness matrix (i.e. the formation segments) along the ray paths corresponding to the shortest theoretical secondary arrival times. The effects of the backprojections along the ray paths are averaged in each cell at step 92 (i.e. the SIRT technique is utilized), with the average of the changes being used to modify the slowness matrix. The procedure may then be repeated as indicated at 95 until a final determination is made.

As indicated in FIG. 2, if desired, after utilizing secondary arrival times and modifying the formation slowness based on secondary arrival times, a reiteration of steps 35 through 60 may be carried out. Also, while not shown, if desired, in utilizing second arrival times, modifications for each source-detector spacing can be used to modify the formation model (such as disclosed with reference to step 57a) rather than averaging the modifications as set forth in step 92.

As aforementioned, the use of secondary wave arrivals is particularly advantageous in reconstructing the near borehole slowness in horizontal well environments where thin reservoirs are intersected over large intervals to increase hydrocarbon production. Evidence of this is seen with reference to FIGS. 8a-8c.

Figure 8A:
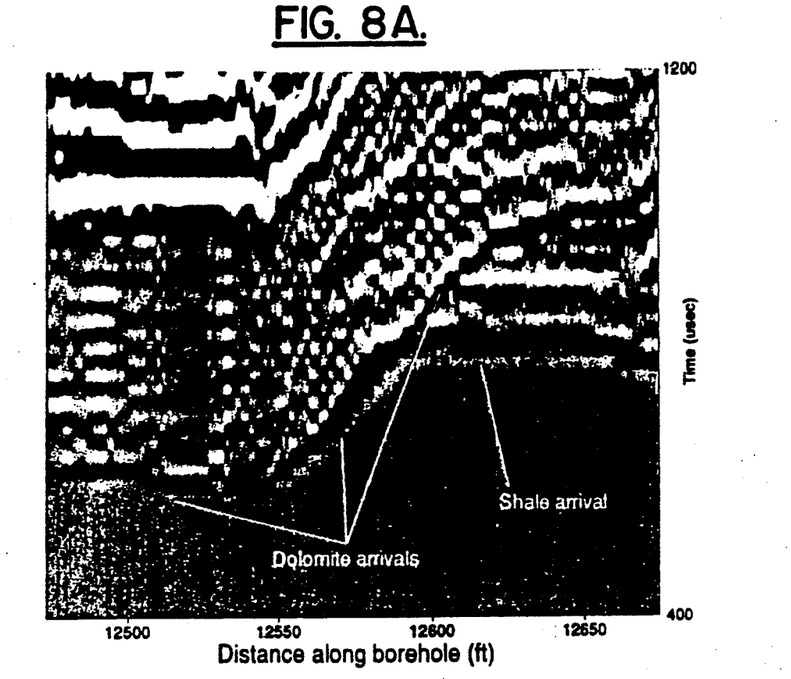
FIG. 8a is a variable density display of raw waveform data for a single receiver, for a horizontal well example.

FIG. 8a shows raw waveform data of a single receiver of a borehole tool as the receiver was moved through the borehole. As indicated, first arrivals were recorded by the receiver at about 600 μsec when the receiver was in the borehole interval of 12475-12550 feet. In the interval from 12550 to 12590 feet, the first arrival time increased steadily from 600 to 800 μsec. Then, in the interval from 12590-12675 feet, the arrival time steadied at about 800 μsec. As indicated in FIG. 8a, the headwave indicated at the borehole interval of 12475-12590 feet is a dolomite arrival, while the headwave of borehole interval 12590-12675 feet is a shale arrival.

Figure 8B:
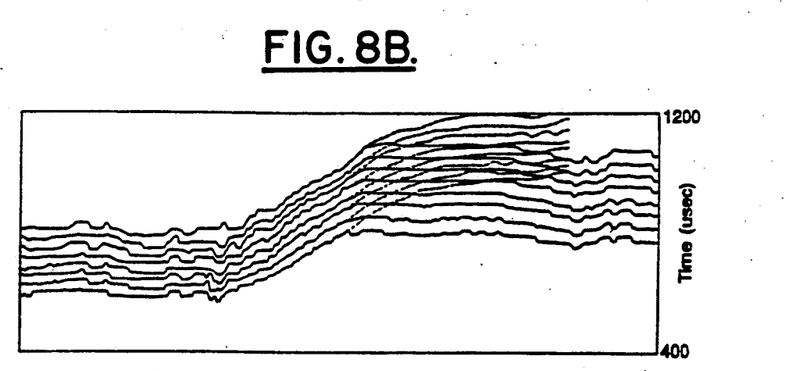
FIG. 8b shows arrival times obtained by a sonic array tool having eight receivers, with the display of FIG. 8a being from one of the eight receivers of the sonic array tool.

FIG. 8b shows the arrival times obtained by the sonic array tool having eight receivers, with the display of FIG. 8a being from one of those eight receivers. First arrival times are shown in FIG. 8b as the solid lines, while second arrival times are shown as the dashed lines. As seen in FIG. 8b, at approximately 12590 feet, the first arrival time levels off, and a second arrival time is detected. Based on these arrival times, alone, it would initially appear that the borehole passed from one bed (e.g. a "fast" dolomite bed) to another bed (e.g. a "slower" shale bed) at 12590 feet. However, those skilled in the art will recognize that even after the borehole tool is in the slower bed, a first arrival can still be obtained from waves passing through the nearby faster bed. The increase in arrival time starting at about 12550-12560 feet can therefore be indicative of a possible bed crossover.

Figure 8C:
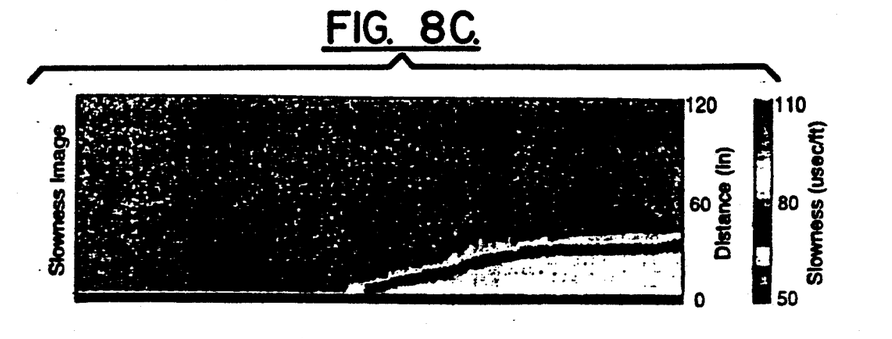
FIG. 8c is a slowness plot obtained in accord with the embodiment of the invention utilizing second arrivals from the waveforms of FIG. 8b.

Utilizing the information from FIG. 8b in accord with the embodiment of the invention utilizing second arrivals, a slowness plot as seen in FIG. 8c was generated with an average slowness value for dolomite being used as the initial slowness background. It appears from FIG. 8c, that the borehole was in a dolomite formation until approximately 12560. From approximately 12550 to 12570 feet, the borehole was crossing a bed boundary. From approximately 12570 feet onward, the borehole was entirely in a shale formation, with the standoff between the borehole and the dolomite increasing about ⅜ inch per foot, until at approximately 12630 feet onward, the borehole continued at a distance of approximately three and a half feet from the dolomite bed. The slowness plot of FIG. 8c shows the sharp transition between formation beds clearly.

Figure 9A:
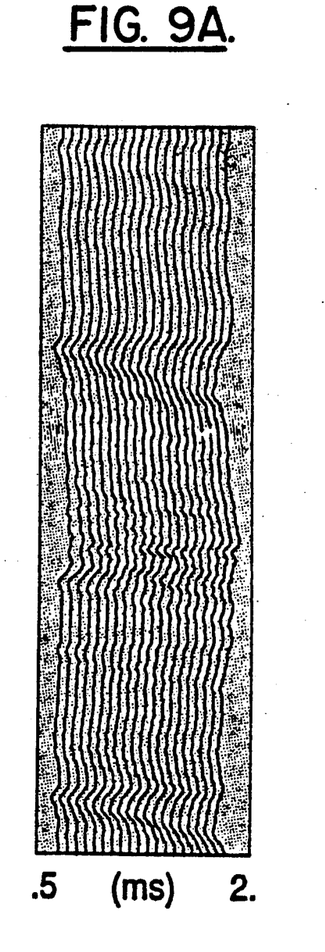
FIG. 9a shows the first arrival times detected by a sonic array tool having twenty receivers in a borehole having a washout.
Figure 9B:
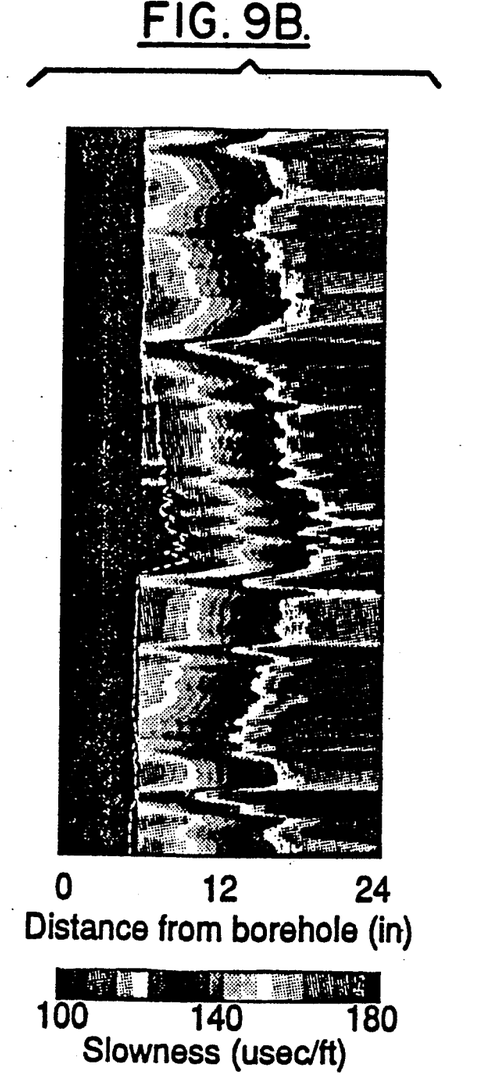

Turning to FIG. 9a, the first arrival times detected by a sonic array tool having twenty receivers is seen. The borehole in which the tool was placed was made by a ten inch bit. From the information of FIG. 9a, and using the first embodiment of the method of the invention as described above with reference to FIG. 2, a slowness plot 9b was generated. In generating the slowness plot, an initial model was chosen having a fixed borehole diameter of ten inches (i.e. five inch radius), a (known) borehole mud slowness of approximately 190 $\mu$sec/ft, and formation slownesses as calculated by the prior art technique of using receiver offsets.

As seen in FIG. 9a as a result of the method invention, at a depth of 6590 to 6610 a borehole washout is identified as the slowness of the borehole extends beyond the five inch radius of the borehole and is maintained an extra four to five inches into the formation. Thus, it will be appreciated by those skilled in the art, that the invention is useful in imaging borehole size increases. This usefulness extends beyond open hole situations to imaging behind casing. In the cased hole, standard tools (e.g. calipers) for determining washout or sanding are not available. The detection of a washout (i.e. caves) caused by sanding during production, and a determination of the severity of such a situation can be of great importance.

There have been described and illustrated herein methods for determining formation and borehole parameters via the two-dimensional tomographic reconstruction of formation slowness. While particular embodiments have been described, it is not intended that the invention be limited thereby, as it is intended that the invention be as broad in scope as the art will allow. Thus, while the invention was described with reference to the use of sonic tools which sense the first arrival of compressional waves, it will be appreciated that the first arrival of shear waves could also be utilized. Similarly, second shear wave arrivals can be utilized in much the same manner as secondary compressional wave arrivals. Also, while the method invention envisions tracing all possible ray paths from the sonic source to the receivers through the formation, it will be appreciated that depending upon how many iterations are utilized and how sophisticated the formation model is, it is possible to limit the ray tracing to a group of most likely ray paths. Further, while particular algorithms and equations were preferred in the backprojection of a function in order to modify initial slowness values, it will be appreciated that other algorithms and equations could be utilized. Therefore, it will be apparent to those skilled in the art that yet other changes and modifications may be made to the invention as described without departing from the scope and spirit of the invention as so claimed.

I claim:

1. A method for determining from data of a sonic tool having a sonic source and a plurality of receivers, the axial and radial slowness of segments of a formation traversed by a borehole, comprising:

a) providing initial slowness values for said formation segments and for said borehole;

b) using said initial slowness values and Snell's law, tracing possible ray path(s) from said source, through a plurality of said formation segments, to each of said plurality of receivers;

c) using said possible ray path(s) and said initial slowness values, computing theoretical first arrival time(s) for said possible ray path(s) for each receiver, and choosing a shortest theoretical first arrival time for each receiver, wherein said shortest first theoretical arrival time corresponds to a theoretical ray path of first arrival for a particular receiver;

d) computing a function of a measured first arrival time and said computed theoretical first arrival time for each receiver, said measured first arrival time for each receiver being determined from said data of said sonic tool;

e) backprojecting said function along said theoretical ray path of first arrival, thereby providing modifications to said initial slowness values for a plurality of said formation segments; and f) modifying said initial slowness values as a function of said provided modifications.

2. A method according to claim 1, further comprising:

g) repeating steps b) through f) a plurality of times, wherein slowness values used in tracing possible ray path(s) in step b) and in computing theoretical first arrival time(s) in step c) are modified slowness values based on results from step f) rather than initial slowness values, and said theoretical first arrival time(s) of step c), said shortest theoretical first arrival time of step c), and said function of step d) are modified accordingly.

3. A method according to claim 1, wherein said data of a sonic tool is collected at a plurality of tool positions in said borehole, said method further comprising:

g) prior to step f), repeating steps b) through e) for a plurality of said tool positions, whereby said modifying of said initial slowness values is accomplished by collecting said modifications of step e) for each formation segment and generating a modification for each formation segment which is a function of the collected modifications for that formation segment.

4. A method according to claim 3, further comprising:
h) repeating steps b) through g) a plurality of times, wherein slowness values used in tracing possible ray path(s) in step b) and in computing theoretical first arrival time(s) in step c) are modified slowness values based on results from step f) rather than initial slowness values, and said theoretical first arrival time(s) of step c), said shortest theoretical first arrival time of step c), and said function of step d) are modified accordingly.

5. A method according to claim 1, wherein:
said step of providing initial slowness values comprises using said data of a sonic tool to calculate a difference in arrival times of sonic waves at at least two of said plurality of receivers, said plurality of receivers having known axial offsets.

6. A method according to claim 5, wherein:
said step of providing initial slowness values comprises obtaining indications of borehole radius along a length of said borehole, and obtaining indications of mud slowness for borehole mud in said borehole.

7. A method according to claim 6, wherein:
said step of providing initial slowness values comprises assigning a first uniform slowness value for each formation segment based on said calculated difference in arrival times, and providing a second uniform slowness value for said borehole based on said indications of mud slowness and indications of borehole radius.

8. A method according to claim 4, wherein:
said step of providing initial slowness values comprises using said data of a sonic tool to calculate a difference in arrival times of sonic waves at at least two of said plurality of receivers, said plurality of receivers having known axial offsets, and assigning a first uniform slowness value for each formation segment based on said calculated difference in arrival times.

9. A method according to claim 1, wherein:
said function of step d) is the mathematical difference between said measured first arrival time and said computed theoretical first arrival time.

10. A method according to claim 4, wherein:
said function of step d) is the mathematical difference between said measured first arrival time and said computed theoretical first arrival time.

11. A method according to claim 3, wherein:
steps b) through are repeated a predetermined number of times.

12. A method according to claim 3, wherein:
steps b) through g) are repeated until either a first threshold related to the magnitudes of the modifications of the initial slowness values is met, or until a second threshold related to the magnitudes of said function of said measured and computed first arrival times is met.

13. A method according to claim 4, wherein:
said plurality of times of step h) is a predetermined number of times.

14. A method according to claim 4, wherein:
steps b) through h) are repeated until either a first threshold related to the magnitudes of said modifications of the slowness values is met, or until a second threshold related to the magnitudes of said function of said measured and computed first arrival times is met.

15. A method according to claim 2, further comprising:
displaying modified slowness values for a portion of said formation as a function of depth in said borehole and radial distance from said borehole.

16. A method according to claim 3, further comprising:
displaying modified slowness values for a portion of said formation as a function of depth in said borehole and radial distance from said borehole.

17. A method according to claim 2, wherein said data of a sonic tool contains information related to secondary arrivals, said method further comprising:
h) using said modified slowness values from step g) and Snell's law, tracing possible secondary ray path(s) from said source, through a plurality of said formation segments, to each of said plurality of receivers;
i) using said possible secondary ray path(s) from step h) and said modified slowness values from step g), computing theoretical second arrival time(s) for said possible secondary ray path(s) for each receiver, and choosing a shortest theoretical second arrival time for each receiver, wherein said shortest second theoretical arrival time corresponds to a theoretical ray path of secondary arrival for a particular receiver;
j) computing a function of a measured second arrival time and said computed shortest theoretical second arrival time, said measured second arrival time being determined from said information related to secondary arrivals;
k) backprojecting said function along said theoretical ray path of secondary arrival, thereby providing additional slowness value modifications; and
l) further modifying slowness values for some of said formation segments as a function of said additional slowness value modifications.

18. A method according to claim 4, wherein said data of a sonic tool contains information related to secondary arrivals, said method further comprising:
i) using said modified slowness values from step h) and Snell's law, tracing possible secondary ray path(s) from said source, through a plurality of said formation segments, to each of said plurality of receivers;
j) using said possible secondary ray path(s) from step i) and said modified slowness values from step h), computing theoretical second arrival time(s) for said possible secondary ray path(s) for each receiver, and choosing a shortest theoretical second arrival time for each receiver, wherein said shortest second theoretical arrival time corresponds to a theoretical ray path of secondary arrival for a particular receiver;
k) computing a function of a measured second arrival time and said computed shortest theoretical second arrival time, said measured second arrival time being determined from said information related to secondary arrivals; and l) backprojecting said function along said theoretical ray path of secondary arrival, thereby providing additional slowness value modifications; and m) further modifying slowness values for some of said formation segments as a function of said additional slowness value modifications.

19. A method for determining from data of a sonic tool having a sonic source and a plurality of receivers, the axial and radial slowness of segments of a formation traversed by a borehole, comprising:

a) providing initial slowness values for said formation segments and for said borehole;

b) using said initial slowness values and Snell's law, tracing possible ray path(s) from said source, through a plurality of said formation segments, to a chosen one of said plurality of receivers;

c) using said possible ray path(s) and said initial slowness values, computing theoretical first arrival time(s) for said possible ray path(s) for said chosen receiver, and choosing a shortest theoretical first arrival time for said chosen receiver, wherein said shortest first theoretical arrival time corresponds to a theoretical ray path of first arrival for said chosen receiver;

d) computing a function of a measured first arrival time and said computed theoretical first arrival time for said chosen receiver, said measured first arrival time for said chosen receiver being determined from said data of said sonic tool;

e) backprojecting said function along said theoretical ray path of first arrival, thereby providing modifications to said initial slowness values for a plurality of said formation segments;

f) modifying said initial slowness values as a function of said provided modifications; and g) repeating steps b) through f) for the remainder of said plurality of receivers, wherein slowness values used in tracing possible ray path(s) in step b) and in computing theoretical first arrival times in step c) are modified slowness values based on results from step f) rather than initial slowness values, and said theoretical first arrival time(s) of step c), said shortest theoretical first arrival time of step c), and said function of step d) are modified accordingly.

20. A method according to claim 19, further comprising:

h) repeating steps b) through g) a plurality of times, wherein slowness values used in tracing possible ray path(s) in step b) and in computing theoretical first arrival times in step c) are modified slowness values based on results from step f) rather than initial slowness values, and said theoretical first arrival time(s) of step c), said shortest theoretical first arrival time of step c), and said function of step d) are modified accordingly.

21. A method according to claim 19, wherein said data of a sonic tool is collected at a plurality of tool positions in said borehole, said method further comprising:

h) repeating steps b) through g) for a plurality of said tool positions, wherein slowness values used in tracing possible ray path(s) in step b) and in computing theoretical first arrival times in step c) are modified slowness values based o results from step f) rather than initial slowness values, and said theoretical first arrival time(s) of step c), said shortest theoretical first arrival time of step c), and said function of step d) are modified accordingly.

22. A method according to claim 20, wherein said data of a sonic tool is collected at a plurality of tool positions in said borehole, said method further comprising:

i) repeating steps b) through h) for a plurality of said tool positions, wherein slowness values used in tracing possible ray path(s) in step b) and in computing theoretical first arrival times in step c) are modified slowness values based on results from step f) rather than initial slowness values, and said theoretical first arrival time(s) of step c), said shortest theoretical first arrival time of step c), and said function of step d) are modified accordingly.

23. A method according to claim 19, wherein:

said step of providing initial slowness values comprises using said data of a sonic tool to calculate a difference in arrival times of sonic waves at at least two of said plurality of receivers, said plurality of receivers having known axial offsets.

24. A method according to claim 23, wherein:

said step of providing initial slowness values comprises obtaining indications of borehole radius along a length of said borehole, and obtaining indications of mud slowness for borehole mud in said borehole.

25. A method according to claim 24, wherein:

said step of providing initial slowness values comprises assigning a first uniform slowness value for each formation segment based on said calculated difference in arrival times, and providing a second uniform slowness value for said borehole based on said indications of mud slowness and indications of borehole radius.

26. A method according to claim 20, wherein:

said plurality of times of step h) is a predetermined number of times.

27. A method according to claim 20, wherein:

steps b) through g) are repeated until either a first threshold related to the magnitudes of the modifications of the initial slowness values is met, or until a second threshold related to the magnitudes of said function of said measured and computed first arrival times is met.

28. A method according to claim 20, further comprising:

displaying modified slowness values for a portion of said formation as a function of depth in said borehole and radial distance from said borehole.

29. A method according to claim 22, further comprising:

displaying modified slowness values for a portion of said formation as a function of depth in said borehole and radial distance from said borehole.

30. A method according to claim 22, wherein said data of a sonic tool contains information related to secondary arrivals, said method further comprising:

j) using said modified slowness values from step f) and Snell's law, tracing possible secondary ray path(s) from said source, through a plurality of said formation segments, to each of said plurality of receivers;

k) using said possible secondary ray path(s) from step j) and said modified slowness values from step f), computing theoretical second arrival time(s) for said possible secondary ray path(s) for each receiver, and choosing a shortest theoretical second arrival time for each receiver, wherein said shortest second theoretical arrival time corresponds to a theoretical ray path of secondary arrival for a particular receiver;

l) computing a function of a measured second arrival time and said computed shortest theoretical second arrival time, said measured second arrival time being determined from said information related to secondary arrivals;

m) backprojecting said function along said theoretical ray path of secondary arrival, thereby providing additional slowness value modifications; and n) further modifying slowness values for some of said formation segments as a function of said additional slowness value modifications.

* * * * *